(12) United States Patent
Hammann

(10) Patent No.: US 8,079,721 B2
(45) Date of Patent: Dec. 20, 2011

(54) ADAPTIVE MIRROR ASSEMBLY

(75) Inventor: Gerhard Hammann, Korntal-Muechingen (DE)

(73) Assignee: TRUMPF Werkzeugmaschinen GmbH + Co. KG, Ditzingen (DE)

(*) Notice: Subject to any disclaimer, the term of this patent is extended or adjusted under 35 U.S.C. 154(b) by 669 days.

(21) Appl. No.: 11/963,326

(22) Filed: Dec. 21, 2007

(65) Prior Publication Data
US 2008/0151399 A1 Jun. 26, 2008

Related U.S. Application Data

(63) Continuation-in-part of application No. PCT/EP2005/006839, filed on Jun. 24, 2005.

(51) Int. Cl.
*G02B 7/185* (2006.01)

(52) U.S. Cl. ...................................................... 359/878

(58) Field of Classification Search .......... 359/845–848, 359/878
See application file for complete search history.

(56) References Cited

U.S. PATENT DOCUMENTS

| | | | |
|---|---|---|---|
| 5,020,895 A | 6/1991 | Giesen et al. | |
| 5,241,991 A | 9/1993 | Iorio et al. | |
| 5,889,256 A | 3/1999 | Osanai | |
| 6,116,257 A * | 9/2000 | Yokota et al. | 137/1 |
| 6,378,558 B1 | 4/2002 | Pohl et al. | |
| 6,751,004 B2 | 6/2004 | Lassar | |
| 2002/0185347 A1* | 12/2002 | Pohl et al. | 188/267.1 |
| 2004/0066561 A1* | 4/2004 | Nagata et al. | 359/676 |
| 2004/0110452 A1* | 6/2004 | Incera et al. | 451/54 |
| 2005/0117232 A1 | 6/2005 | Forsberg | |

FOREIGN PATENT DOCUMENTS

| | | |
|---|---|---|
| DE | 39 00 467 | 7/1990 |
| DE | 4137832 | 5/1993 |
| DE | 196 13 252 | 11/1996 |
| DE | 10157983 | 6/2003 |
| JP | 2000326084 A | 11/2000 |
| JP | 2001038485 A | 2/2001 |

OTHER PUBLICATIONS

David J. Griffiths & Reed College, Introduction to Electrodynamics, p. 215 (3d ed. 1999).*
International Preliminary Report and Written Opinion from corresponding PCT Application No. PCT/EP2005/006839, mailed Jan. 25, 2006, 8 pages.
English translation of International Preliminary Report and Written Opinion from corresponding PCT Application No. PCT/EP2005/006839, mailed Jan. 24, 2008, 6 pages.
Translation of Office Action from corresponding Japanese Patent Application No. 2008-517331, issued Feb. 10, 2011, 3 pages.

* cited by examiner

*Primary Examiner* — Jennifer L. Doak
(74) *Attorney, Agent, or Firm* — Fish & Richardson P.C.

(57) ABSTRACT

A mirror assembly for an optical system of a laser processing machine includes a mount with a cavity, and an adaptive mirror. A magnetorheological or electrorheological fluid flows through the cavity, is adjusted in its viscosity, and provides an adjustable pressure onto the adaptable mirror.

11 Claims, 3 Drawing Sheets

ADAPTIVE MIRROR ASSEMBLY

CROSS REFERENCE TO RELATED APPLICATION

This application is a continuation-in-part of, and claims priority under 35 U.S.C. §120 to PCT/EP2005/006839, filed on Jun. 24, 2005, and designating the U.S., the contents of which is hereby incorporated by reference in their entirety.

TECHNICAL FIELD

The invention relates to a mirror assembly, in particular, for an optical system of a laser processing machine.

BACKGROUND

Mirror configurations are essential components of lasers and laser processing machines. The mirrors can be used to deflect laser beams.

The German publication DE 3900467 A1 discloses a mirror that includes a frame having a cavity and an adaptive mirror.

A desired focal length of a deflecting mirror can be adjusted by corresponding pressurization of the mirror back side. The mirror can be integrated in the cooling water circuit of the laser. The pressure against a restrictor in an outlet branch can be adjusted via a proportional valve. The dynamic range that can be achieved can be limited on the one hand by a cut-off frequency of a control system (electromagnetically driven valve) and on the other hand by the reaction of the axial acceleration on the transfer medium (water column). The controlled system can achieve a typical cut-off frequency of about 10 Hz. Axial accelerations of about 2 g can be considered as the admissible upper limit.

U.S. Pat. No. 6,751,004 discloses the use of magnetorheological fluids.

German publication DE 10157983 A1 describes a method and a device for positioning and/or processing workpieces with a laser processing machine.

SUMMARY

In one aspect of the invention, a mirror assembly for an optical system of a laser machining tool includes a frame enclosing a cavity that is filled with a magnetorheological or a electrorheological fluid; and an adaptive mirror coupled to the cavity, wherein the adaptive mirror is adaptable by changing a pressure within the cavity.

In some embodiments, a magnetorheological or electrorheological fluid valve can be an integral part of the frame. The mirror assembly can include a pressure sensor for measuring the pressure of the magnetorheological or electrorheological fluid. The frame can include electrodes.

In another embodiment of the invention, a mirror assembly for an optical system of a laser machining tool includes an adaptive mirror and a magnetorheological or electrorheological fluid valve. The magnetorheological or electrorheological fluid valve is defined by a flow channel for passing a magnetorheological or electrorheological fluid and the flow channel is delimited on a side of the housing by the adaptive mirror, wherein the adaptive mirror is deformable by changing a pressure within the flow channel when actuating the fluid valve.

An electrorheological and/or magnetorheological fluid valve is a valve that includes a device that changes the viscosity of an electro- and/or magnetorheological fluid. Example devices include devices for generating electric and/or magnetic fields that can interact with an electrorheological and/or magnetorheological fluid passing the electrorheological and/or magnetorheological fluid valve and thereby changes the fluid's viscosity. Specific example devices include electrodes, coils, and switchable magnets.

In some embodiments, the fluid valve can include electrodes and the fluid valve can be actuated by applying an electrical field between the electrodes to change a viscosity of the magnetorheological or electrorheological fluid.

In some embodiments, the fluid valve can include a coil for generating a magnetic field in the flow channel and the fluid valve can be actuated by adjusting the current through the current to adjust the magnetic field in the flow channel to change a viscosity of the magnetorheological or electrorheological fluid.

At least one part of the coil can be provided within a frame of the fluid valve.

In some embodiments, the mirror assembly can further include a power supply for supplying a voltage to the electrodes and/or supplying a current to the coil.

In some embodiments, the mirror assembly can further include a controller configured to adjust one or more of a magnetic field and the electric field within the flow channel.

The controller can be configured to control a viscosity of the magnetorheological or electrorheological fluid within the flow channel by adjusting one or more of the magnetic and the electric field.

The mirror assembly can further include a pressure sensor for measuring the pressure of the magnetorheological or electrorheological fluid within the flow chamber. The pressure sensor can be connected to a controller.

In another embodiment of the invention, a mirror assembly for an optical system of a laser machining tool includes a magnetorheological or electrorheological fluid valve defined by a flow channel for passing a magnetorheological or electrorheological fluid, the flow channel being delimited by a wall, and the wall being deformable by changing a pressure within the flow channel when operating the fluid valve. The mirror assembly further includes an adaptive mirror with a back side attached to the wall, the geometry of the adaptive mirror being adaptable by deforming the wall.

In some embodiments, the fluid valve can include electrodes and the fluid valve can be actuated by applying an electrical field between the electrodes to change a viscosity of the magnetorheological or electrorheological fluid.

In some embodiments, the fluid valve can include a coil for generating a magnetic field in the flow channel and the fluid valve is actuated by adjusting the magnetic field to change a viscosity of the magnetorheological or electrorheological fluid.

The coil can include at least one part being provided within a frame of the fluid valve.

The mirror assembly can further include a power supply for supplying a voltage to the electrodes and/or for supplying a current to the coil.

In another aspect of the invention, a mirror configuration of an optical system of a laser processing machine includes a mount with a cavity, and an adaptive mirror, wherein a magnetorheological or electrorheological fluid is disposed in the cavity.

In some embodiments, the mirror configuration can be less susceptible to contamination because the valve is easy to handle due to a comparatively large flow cross-sections. In addition, in some embodiments, the valve can be free of moving parts. A system based on a valve that is integrated in the mirror body can provide an increased dynamical range and robustness. Integrating the magnetorheological fluid (MRF) or electrorheological fluid (ERF) valve into the mirror can allow minimizing the dead volume in the control path in combination with a direct measurement of a dynamic pressure. Cut-off frequencies of the ERF system can be achieved of considerably more than 100 Hz. The response times of magnetorheological or electrorheological liquids can be in the range of one millisecond.

When a sensor is provided for direct measurement of the pressure of the electrorheological or magnetorheological fluid, the fluid valve can be controlled, which can be advantageous when using the mirror configuration.

Some embodiments can have the advantage that electrical signals are directly converted into mechanical properties. The response times of the valves or actuators can be very fast. The design and integration of the components can be realized with a large degree of freedom. A further advantage of some embodiments can be a simple mechanical structure. The valves can have a low wear out.

Further features and advantages of the invention ensue from the following description of examples of embodiment of the invention, with the aid of the figures of the drawing, which show individual details essential to the invention, and from the claims. The individual features can be put into effect in a variant of the invention either individually, or in a plurality of any kind of combination.

The details of one or more embodiments are set forth in the accompanying drawings and the description below. Other features, objects, and advantages will be apparent from the description and drawings, and from the claims.

DETAILED DESCRIPTION

Figure 1:
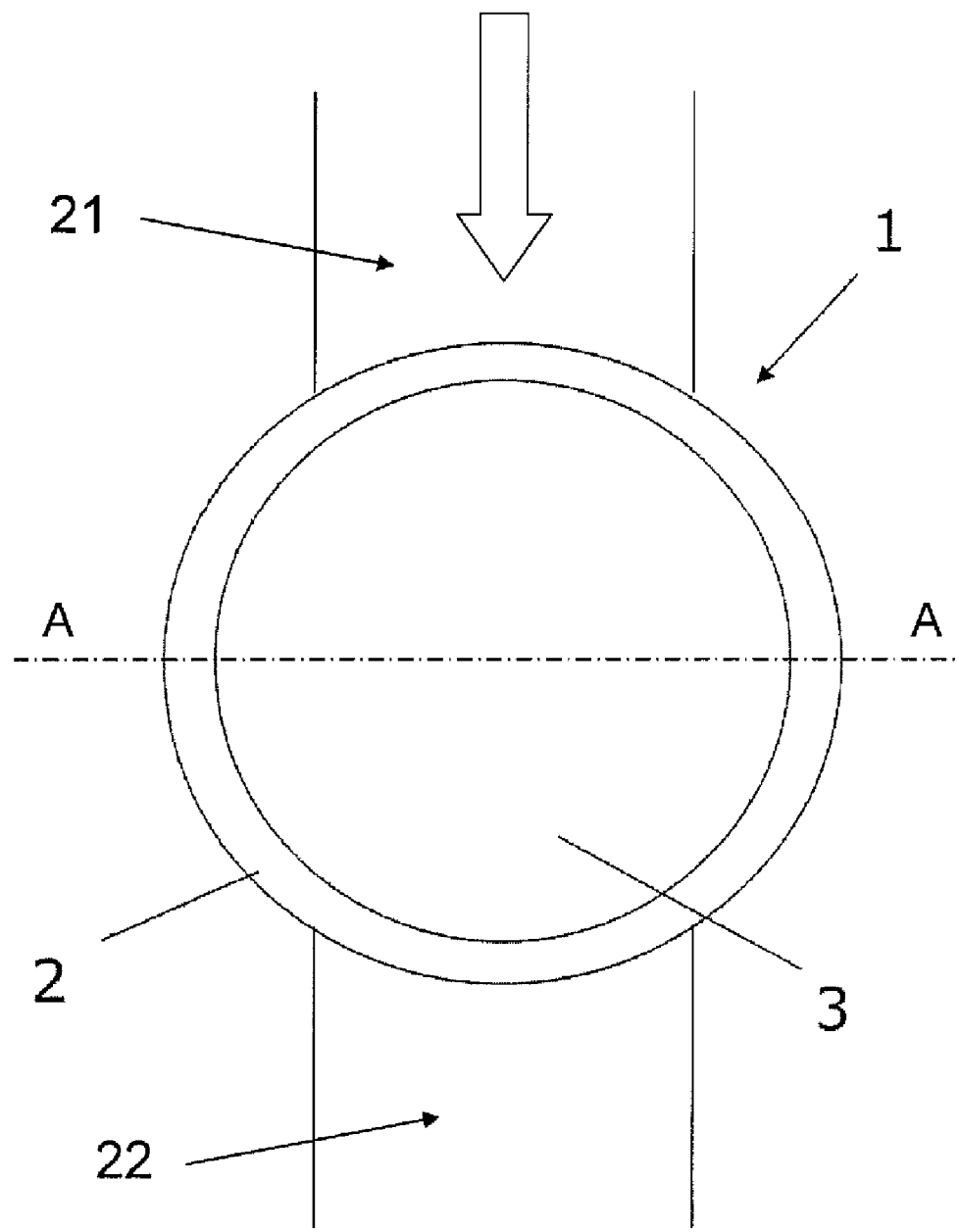
FIG. 1 is a top view of an adaptive mirror assembly.

FIG. 1 shows the structure of an adaptive mirror configuration 1 of a laser processing machine. An annular mount 2 holds a mirror 3. The annular mount 2 receives the mirror 3 such that a cavity 20 is formed behind the mirror 3 (see FIG. 2). An increase or reduction of the pressure in the cavity changes the geometry of the mirror 3. The mirror 3 can be based on a substrate that is able to deform and is therefore made of a suitable material, e.g., of glass, or metal. The material of the substrate has, e.g., a thickness of a few millimeters that allows a deformation of the geometry of the mirror within the range of pressure that can be achieved. The size corresponds to, for example, a laser beam diameter of the laser processing machine. Typical diameters can be of a few millimeters to a few centimeters, e.g., 8 cm, or even more. Examples of mirrors include focussing and defocusing mirrors. The mirror can be mounted in the periphery such that the pressure acts mainly in the central area of the mirror, as indicated in the FIG. 2.

Figure 2:
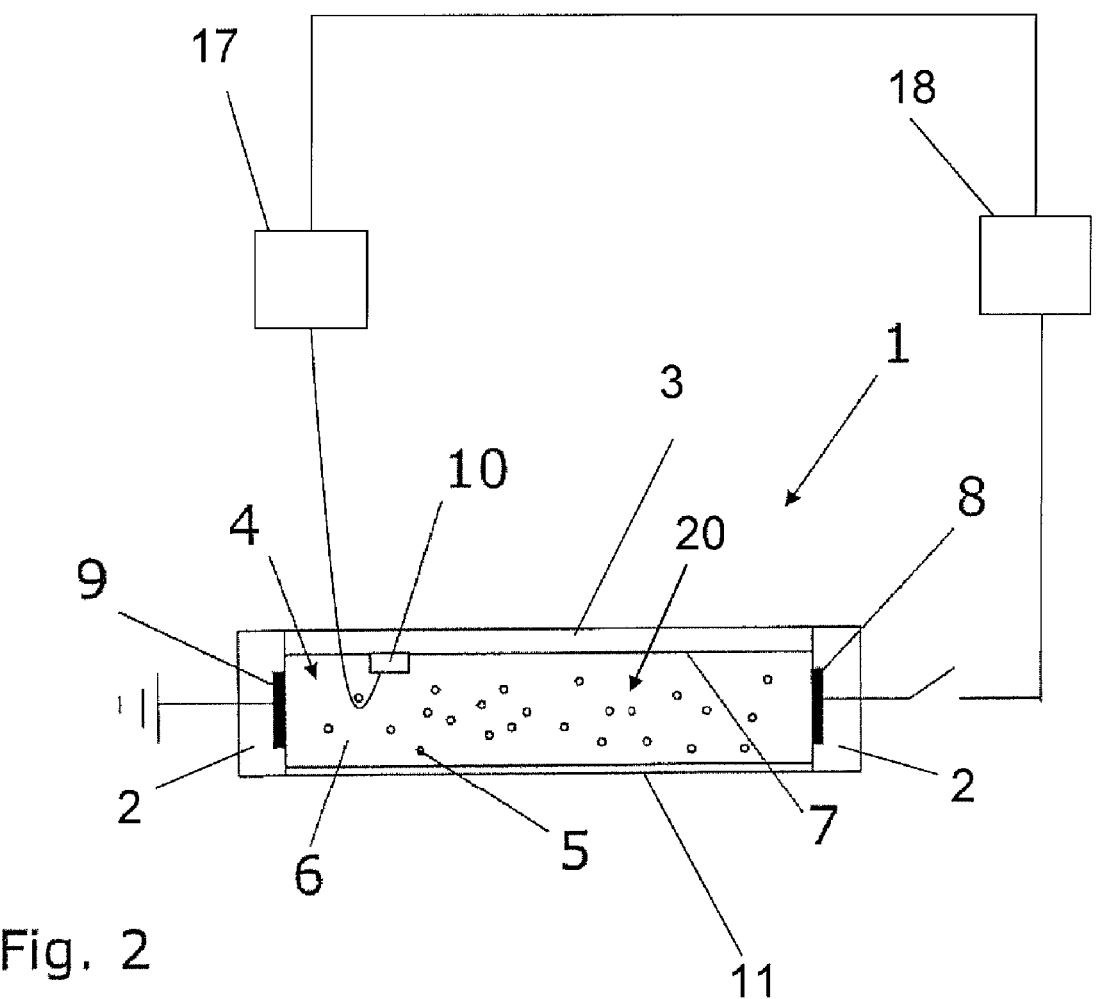
FIG. 2 is a side cross-sectional view of the mirror assembly of FIG. 1 taken along A-A, where the mirror assembly is adapted for an electrorheological fluid.

In the embodiment of FIG. 2, the mirror configuration 1 is used in connection with an electrorheological fluid and is configured to operate as a valve, which is integrated into the mirror configuration 1. Opposite to the mirror 3, the cavity of the mount 2 is covered with a back wall 11 and is filled with a fluid 4 that is an electrorheological fluid (ERF) or a magnetorheological fluid (MRF). Using the cavity 20 as a part of flow channel for the fluid 4, the fluid 4 can flow into the cavity through an inlet 21 and exit the cavity through an outlet 22. The inlet 21 and the outlet 22 can be openings in, e.g., the annular mount 2. When the electrorheological fluid is pumped through the cavity, pressure builds up in the cavity and acts on the mirror 3. The pressure depends on the viscosity of the electrorheological fluid. Depending on the material and the thickness of the mirror 3, the geometry of the mirror 3 can be deformed by adjusting the pressure within the cavity 20. The mirror can be mounted such that the cavity is sealed to avoid or minimize leakage of the fluid 4, e.g., by gluing or using an O-ring sealing. The fluid 4 contains field polarizable particles 5 and a particle carrier 6. Examples of electrorheological fluids include suspensions of fine non-conducting particles in an electrically insulating fluid. The apparent viscosity of these fluids changes reversibly by an order of 100,000 in response to an electric field. For example, a typical ERF can go from the consistency of a liquid to that of a gel, and back, with response times on the order of milliseconds. Examples of a magnetorheological fluid include a fluid that consists of 20-40 percent by volume of relatively pure, 3-10 micron diameter iron particles, suspended in a carrier liquid such as mineral oil, synthetic oil, water or glycol.

The fluid 4 reacts to electric and/or magnetic fields or field changes. The particles 5 can be polarized and arranged in chains. Examples of electrorheological or magnetorheological fluids include dispersions of a non-polar carrier 6 and solid particles 5, which can be polarized. The chains can increase the viscosity of the fluid 4. Without the presence of an electric and/or magnetic field, the particles 5 are in a non-organized state. In the non-organized state, the viscosity of the fluid 4 is lower than in an organized state, which is caused when the fluid 4 is exposed to an electric and/or magnetic field. Thus, the electric/magnetic field changes the flow properties of the fluid 4. The changes can cover a range from the fluid 4 being in a liquid state to the fluid reaching the flow limit. The change can be performed continuously and within less than one millisecond. Thus, a mechatronical effect can be obtained.

The mirror has a back side 7 that is pressurized and the pressure can be adjusted by changing the flow pressure through the flow channel within the cavity 20. The pressure and the volume flow can be adjusted by changing a viscosity of the fluid 4 in the electric field. An electrorheological valve is formed at least in part of the flow channel, which can have a comparatively large cross-section.

In general, such an electrorheological and/or magnetorheological fluid valve is a valve that includes a device that changes the viscosity of an electro- and/or magnetorheological fluid. Example devices include devices for generating electric and/or magnetic fields that can interact with an electrorheological and/or magnetorheological fluid passing the electrorheological and/or magnetorheological fluid valve and thereby changes the fluid's viscosity. Example devices include electrodes as shown in FIG. 1, coils as shown in FIG. 2, and switchable magnets.

The amount of fluid allowed to pass through the valve can be varied by changing the flow properties, e.g., the viscosity of the fluid. In the embodiment of FIG. 2, to actuate the valve with an electrorheological fluid 4, one can build up an electric field using electrodes 8 and 9, which can be embedded in opposing parts of wall 2 surrounding the flow channel. The electrodes can be designed in various ways.

The pressure of the fluid 4 can be directly measured with a sensor 10 that is disposed in the cavity close to the mirror 3. The fluid valve can be controlled by a controller 17, e.g., of the laser processing machine that controls and/or switches a power source 18 that supplies a voltage, for example, at the electrode 8. The mirror 3 can be used as a deflecting mirror. The desired focal length of the mirror 3 of a laser beam can be adjusted through corresponding pressurization of the back side 7 of the mirror 3.

Figure 3:
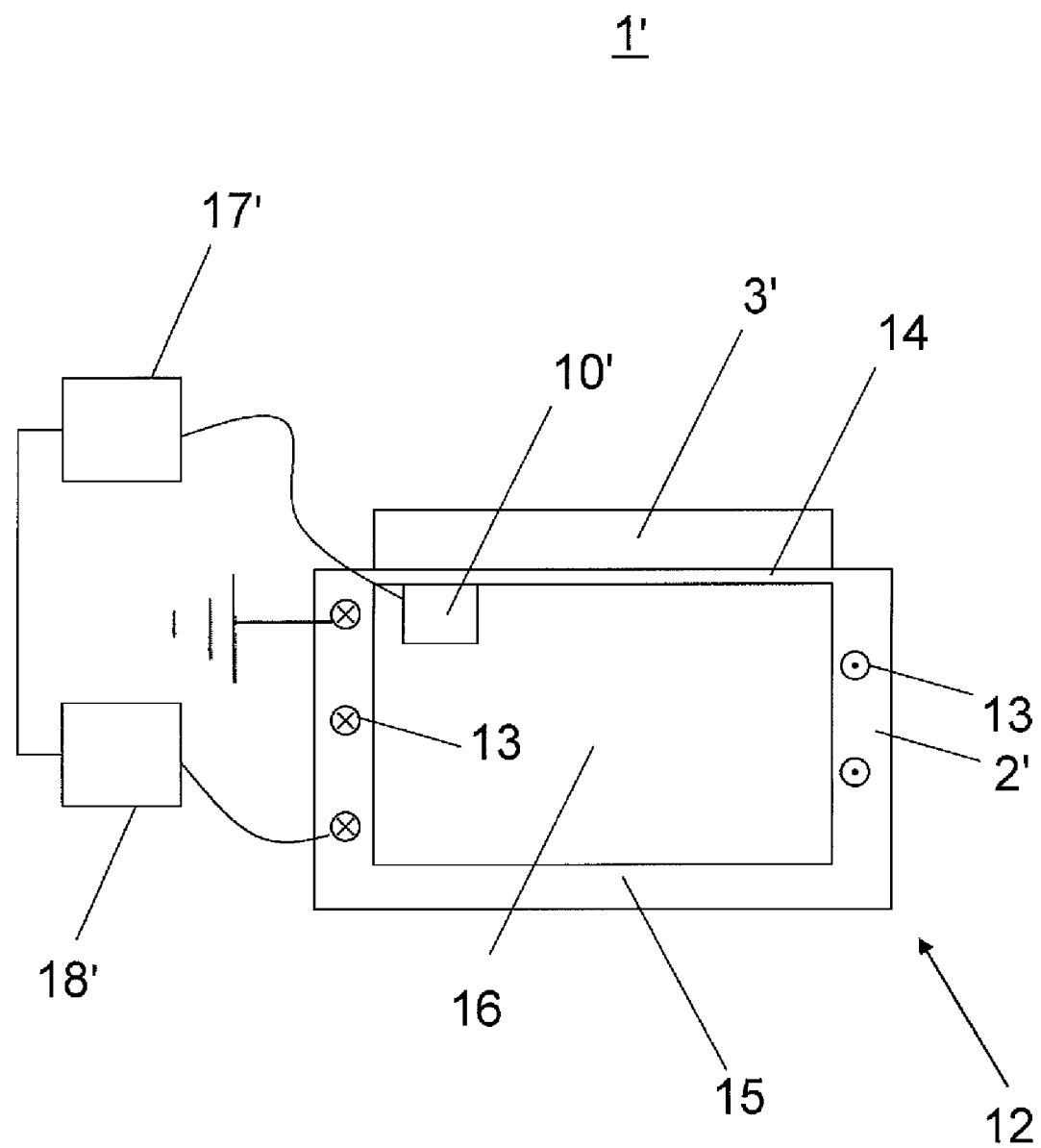
FIG. 3 is a side cross-sectional view of the mirror assembly of FIG. 1 taken along A-A, where the mirror assembly is adapted for a magnetorheological fluid.

FIG. 3 shows another embodiment of an adaptive mirror assembly 1' with a fluid valve 12 and a mirror 3'. The fluid valve 12 includes an annular mount 2', a deformable front wall 14, and a back wall 15. The inside of the valve 12 is configured as a flow channel 16. A coil 13 is integrated in the annular mount 2' to produce a magnetic field within the fluid channel 16 which houses the fluid 4. An inlet and an outlet (not shown in FIG. 3 but shown in FIG. 1) of the flow channel 16 are connectable to a pump system for pumping the fluid 4 through the fluid valve 12. The mirror 3' is attached to the deformable front wall 14 such that a deformation of the front wall 14 causes a deformation of the mirror 3'.

The pressure within the flow channel 16 can be adjusted by adjusting a pumping pressure. Moreover, the pressure can be adjusted by changing the viscosity of the fluid 4. The viscosity of a magnetorheological fluid can be modified by applying a current to the coil 13 and thereby creating a magnetic field, which acts on the magnetorheological fluid within the flow channel 16. The valve can therefore be actuated by sending the current through the windings 13, which causes the build up of a suitable magnetic field for controlling the viscosity of a magnetorheological liquid. Accordingly, the pressure can be controlled.

Depending on the pressure present within the flow channel and acting on the front wall 14, the geometry of the mirror 3' can be adjusted. A pressure detector 10' can be attached to the front wall 14 and send measured pressure values to a controller 17'. Depending on a received pressure value and, for example, on a required focus length of the adaptive mirror 3', the controller 17' controls a power supply 18' to increase or decrease the current supplied to the coil 13. Accordingly, the viscosity of the fluid 4 within the flow channel is increased or decreased such that the pressurization of the mirror 3' is set to adapt the curvature of the mirror 3'.

In some embodiments, the mirror 3 can be an integral part of the frame 2. For example, the frame 2 can include a curved wall that is polished and covered with a reflective layer. Changing the pressure within the frame can directly affect the curvature of the curved wall. Electrodes can again be provided within the frame or a coil can be provided within the flow channel, the frame, and/or outside the frame.

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A mirror assembly for an optical system of a laser machining tool, the mirror assembly comprising:
   an adaptive mirror; and
   a magnetorheological or electrorheological fluid valve defined at least in part by a flow channel for passing a magnetorheological or electrorheological fluid, respectively, the flow channel being delimited on a side of a housing by the adaptive mirror,
   wherein the adaptive mirror is deformable by changing a pressure within the flow channel when actuating the fluid valve,
   wherein the electrorheological fluid valve comprises electrodes and is configured to be actuated, during operation of the mirror assembly, by applying an electrical field between the electrodes to change a viscosity of the electrorheological fluid, and
   wherein the magnetorheological fluid valve comprises a coil for generating a magnetic field in the flow channel and is configured to be actuated, during operation of the mirror assembly, by adjusting the current through the coil to adjust the magnetic field in the flow channel to change a viscosity of the magnetorheological fluid.

2. The mirror assembly of claim 1, wherein the electrorheological fluid valve comprises a power supply for supplying a voltage to the electrodes.

3. The mirror assembly of claim 1, wherein the coil includes at least one part being provided within a frame of the fluid valve.

4. The mirror assembly of claim 1, wherein the magnetorheological fluid valve comprises a power supply for supplying a current to the coil.

5. The mirror assembly of claim 1, further comprising a controller configured to adjust one or more of a magnetic field and the electric field within the flow channel.

6. The mirror assembly of claim 5, wherein the controller is configured to control a viscosity of the magnetorheological or electrorheological fluid within the flow channel by adjusting one or more of the magnetic and the electric field.

7. The mirror assembly of claim 1, further comprising a pressure sensor for measuring the pressure of the magnetorheological or electrorheological fluid within the flow chamber.

8. The mirror assembly of claim 7, wherein the pressure sensor is connected to a controller.

9. A mirror assembly for an optical system of a laser machining tool comprising:
   a magnetorheological or electrorheological fluid valve defined by a flow channel for passing a magnetorheological or electrorheological fluid, respectively, the flow channel being delimited by a wall, and the wall being deformable by changing a pressure within the flow channel when operating the fluid valve; and
   an adaptive mirror with a back side attached to the wall, the geometry of the adaptive mirror being adaptable by deforming the wall,
   wherein the electrorheological fluid valve comprises electrodes and is configured to be actuated, during operation of the mirror assembly, by applying an electrical field between the electrodes to change a viscosity of the electrorheological fluid, and
   wherein the magnetorheological fluid valve comprises a coil for generating a magnetic field in the flow channel and the magnetorheological fluid valve is configured to be actuated, during operation of the mirror assembly, by adjusting the magnetic field to change a viscosity of the magnetorheological fluid.

10. The mirror assembly of claim 9, wherein the electrorheological fluid valve comprises a power supply for supplying a voltage to the electrodes.

11. The mirror assembly of claim 9, wherein the magnetorheological fluid valve comprises a power supply for supplying a current to the coil.

* * * * *